Aug. 13, 1935.　　　　M. F. HILL　　　　2,011,338
AIR COMPRESSOR
Filed April 10, 1922
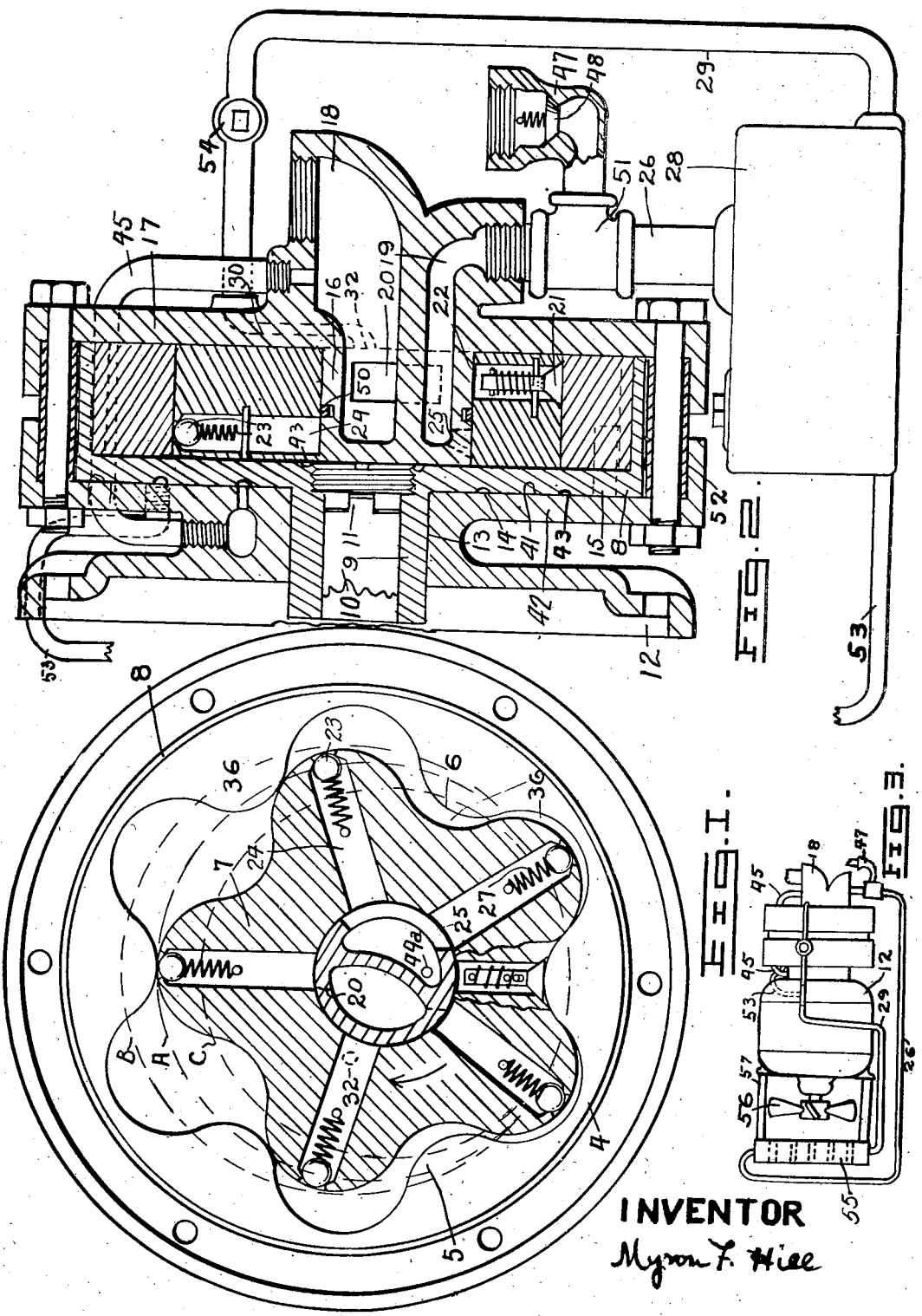
INVENTOR
Myron F. Hill Patented Aug. 13, 1935

2,011,338

UNITED STATES PATENT OFFICE 2,011,338

AIR COMPRESSOR

Myron F. Hill, New York, N. Y.

Application April 10, 1922, Serial No. 551,079

11 Claims. (Cl. 230—144)

My invention relates to air compressors having a rotary mechanical movement for compressing air or other elastic fluid. It relates particularly to a rotary movement having an external or annular rotar, and an internal or pinion rotor with one less tooth, working inside of it, opening and closing spaces so that the spaces during the closing phase are maintained air tight from each other. It relates specifically also to rotors having teeth and tooth spaces having epicycloidal and hypocycloidal curves.

My invention relates also to valves, driving means, a liquid sealing and cooling system; and a stuffing box, so cooperating with other parts as to make possible high pressures with economy and efficiency for long continued runs, of great value for automatic operation. My application 616,778 is a divisional application from this.

In the drawings:—

Figure 1 shows in elevation, an annular rotor, and a pinion with one less tooth inside of it, shown in section on a line thru the discharge ports, with a portion in section thru an intake valve.

Fig. 2 is a longitudinal section of the same.

Fig. 3 is an elevation of one form of complete compressor.

In the figures an annular wheel or rotor 4 may be provided with teeth 5 having for their convex portions pure hypocloidal curves 6, and a pinion 7 having one less tooth, with the convex portions of the teeth provided with pure epicloidal curves to provide fluid tight engagements with the teeth of the annular as they rotate together and close the chambers between them to compress air.

These cycloidal curves may be formed in different ways. One way is to describe them by means of a point in a generating circle A rolling in the annular pitch circle B to form the annular tooth hypo-cycloids and on the pinion pitch circle C to form the pinion epi-cycloids. These cycloids should be formed on separate pitch circles, that for the annular being larger than that for the pinion, to allow for the ratio between the numbers of teeth, and to provide easy running. The rotor space curves may be determined by making them the complements of the tooth cycloids as they cross the center line at full mesh. They may be provided with enough clearance for a free running fit. I prefer to have the pinion rotor spaces fairly close to theoretical size to maintain tight contact at full mesh to prevent escape of compressed air from the high pressure rotor chambers to the chambers just beginning to open. The annular tooth spaces or portions of contours between contour portions providing the fluid tight engagements may be deeper in their outer portions than the theoretical form in order to carry some of the sealing liquid around in those portions in pools. When they reach the point of full mesh the pinion teeth distribute the liquid over the surfaces of the rotor teeth and spaces thus lubricating them and cooling them to offset the heat of compression.

The teeth and tooth spaces of the pinion may be determined and formed by means of a cutter having the form of an annular tooth, rotated between cuts about the pinion blank in the successive positions assumed by the tooth of the annular with relation to the pinion. This generates the pinion teeth and spaces. As indicated above the theoretical curves of the annular spaces may be similarly formed before deepening. Such a space will remain in air tight relation with an annular tooth at full mesh with a liquid seal.

The generating circle may have a diameter that is a mean between the diameters of the two pitch circles. In such case the lengths of the outer cycloids are longer than the inner ones, and the cycloids of a rotor are all the same length. This factor is however of no known consequence.

If the generating circle A is the mean between the two pitch circles, the teeth and tooth spaces are the same height from their respective base circles. This application is however not limited to this feature. If the generating circle A departs from this mean diameter, the teeth of the two rotors may vary in height from each other but are complements to their mating tooth spaces as they cross the center line in the region of full mesh. That is, the tooth contours have a generative relation to each other. That is, the tooth spaces of one rotor are complementary in theory to the teeth of the other rotor in this region. This provides that the dedendum of one rotor has the correct sliding and rolling relation to the addendum of the other rotor in the full mesh region, and since the teeth on both rotors are generated by intermediate circle A, the teeth of both rotors are fully complementary to each other, i. e. have generated relations to each other. If the generating circle A is greater than the mean between the pitch or base circles, the addendum teeth on the outer rotor are less in height than the addendum teeth on the inner rotor. If the intermediate circle A is less than the mean between the pitch circles, the addendum teeth of the inner rotor are less than the addendum teeth on the outer rotor. If other generated relations above specified are carried out the sum of the heights of the dedendum and addendum curves of a given rotor is always the same, as when the heights and depths of the two curves are equal. It was thought at one time that if addendum curves of the two rotors were equal in height, the result might be better. Later experience shows that this is not the fact. If the addendum curves of one rotor are greater than those of the other rotor, according to cooperative factors in a pump, the result, and particularly the durability, will be improved.

I prefer to incorporate my compressor with a motor in the same housing, with one end of the motor shaft bearing acting also as a bearing for the compressor. This provides the simplest and most compact form.

A driving connection is preferable and since for some purposes driving the annular gives better results than driving the pinion, I employ as a driving connection a sort of driving plate or bell, one end mounted in or on a shaft of the motor and the other end carrying the annular. This driving bell is shown at 8, and has a hub 9 in which the end of the motor shaft 10 rests. The driving bell is keyed to the shaft by means of any form of key. I prefer the screw plug threaded into the driving bell in such a direction that it tightens under the influence of the drive, and having a slot to fit the tongue 11 on the end of the shaft. The plug should be air tight in the driving bell to prevent air leakage there.

The motor itself may be of any standard type if desired, and adapted to be secured to the end 12 of the housing or casing. An electric motor is most useful. My construction permits my compressor to be substituted for the usual end bracket of such a motor upon the end opposite to the commutator. Of course it may be incorporated in other ways with corresponding advantage.

The hub 9 is journaled in the housing at 13 which acts also as a bearing for the electric motor shaft 10. This journal may be lubricated from the groove 14 by capillary attraction, the groove 14 being kept full of oil as hereinafter described. The annular rotor may be keyed to the driving bell by a pin 15.

The pinion is journaled upon an eccentric boss 16 which may be part of the cover plate 17, and centered in the pitch circle C.

This boss may have two passageways or ports thru it, one 18 for the suction or intake, and the other 19 for the discharge of compressed air. The intake is connected thru the opening 20 to the poppet valves 21 of which there is one in each pinion rotor space. Each valve 21 is held closed by compressed air and by a spring which is just strong enough to counteract centrifugal force. Suction in the opening rotor chambers opens the valves 21 to admit air at about atmospheric pressure. When air no longer enters the rotor chambers due to their reaching their limit of volume, the valves 21 close and air is compressed as the chambers contract until the pressure of the discharge passageway 19 is reached after which the increasing pressure in the chambers forces open the discharge valves 23 and passes out thru the opening 25 in the boss 16 and thru the discharge passageway 19 to any pipe or container.

A compressor of this type is capable of highly efficient operation when it is provided with a liquid seal. Lubricating oil or other liquid may furnish such a seal. It forms a film on the sides of the rotors between the chambers and between the high pressure and low pressure sides and prevents the escape of air thereat. A film also forms upon the tooth surfaces between the opposing teeth, to render them air tight if surfaces are rough. Oil or other sealing liquid may be supplied to such a compressor at a point some distance from the low pressure area if the oil is to be supplied freely under pressure, or it may be fed into the intake.

I prefer to locate the port against the side of a pinion, in order that centrifugal force may supply the film to the annular. Its size, and distance from the intake region, the thickness of film, and viscosity determine the volume supplied. More than one port may be used and may supply a film at one or both sides of either the pinion or annular so long as high pressure oil is not connected freely to the low pressure suction pipe. The valve 54 may adjust the limit of the oil or liquid supply.

The port employed in this construction may be located at 32 (Fig. 1) and connected to the reservoir 28 by the pipe 29 and the passageway 30. Oil is discharged with air thru the discharge valves and passageway 19, and is drained off into the reservoir 28 thru the connection 51 and pipe 26. The connection 51 may represent any suitable oil separator, the oil going to the reservoir and the air connected thru the check valve 48 to such pipe or container as may be desired. The port 32 is preferably in the non-rotating cover plate but is located preferably in the radial position shown in Fig. 1.

The sealing liquid may supply the lubrication needed by the pump.

By means of these connections it is evident that when starting, the compressor has little work to do,—that is, it is "unloaded". As pressure increases it is communicated to the reservoir 28 and drives the oil thru the pipe 29 to the oil port. From this port it travels through film spaces and gear spaces and issues at any low pressure exit that it can reach. If it issues thru the intake passageway it is again drawn thru the intake valves into the rotor chambers and again delivered thru the discharge valves to the reservoir. It may also travel over the outside of the driving bell down over the back wall 41 of the bell and out thru the journal 13 unless some means is provided to stop it. For this purpose the pressure of compressed air in the chambers forces the back wall 41 of the driving bell against the wall 42 of the housing and minimizes the flow. To effectually prevent the loss of the oil from the system however it is drawn back into the suction pipe and again pumped back into the reservoir. This is accomplished by the groove 14 which is connected to the suction connection by means of the pipe 45; so that the pressure upon the oil inside of the circle of groove 14 and in the journal 13 is removed, and the oil is not driven out, so that the film in these areas can be maintained by capillary attraction.

In order to effectually shut off the possibility of air or gas in the form of minute bubbles in the oil, from escaping, fresh cool oil from the reservoir, and at the same or perhaps greater pressure, is connected by means of a pipe 53 from the reservoir to the groove 43 so that bubbles of elastic fluid are prevented from reaching the groove. The fluid pressure thus introduced between the casing wall and the rear or left hand side of the driving bell or plate 15 exerts a thrust against the latter along the groove and on either side of it, opposing the thrust upon the other or right hand side of the plate 15 exerted by compressed gases in the closing rotor chambers tending to push the driving plate toward the casing wall. This is a valuable feature for a compressor for noxious gases such as sulphur dioxide or ammonia in refrigerating units and in fact for any kind of a compressor where rotor chamber pressure exerts such a thrust.

This fresh oil (or other liquid) travels from the groove 43 to the groove 14 and from there to the suction.

The pipes 45 and 53 are kept filled with oil to their upper levels even when the pump is idle thus preventing leakage. When using noxious gases it is presumed that they are in an enclosed system connected to the pipe connections at 18 and 47.

In case oil gathers in the rotor chambers when the pump is idle and the motor starts to run, the oil is forced out thru the discharge valves 21.

Air at pressure might escape across from the opening 25 to the opening 20 into the intake passageway, particularly as the journal wears loose. This would nullify all compression in the rotors. In order to prevent it, I employ a piston ring 50, fitted in a groove in the boss 16 and expanding against the inner wall of the pinion maintaining a tight relation regardless of working freedom or of looseness due to wear.

The housing includes a ring 52 which surrounds the driving bell and may be of slightly greater thickness to separate the back wall 42 and the cover plate 17 just enough to allow free running of the driving bell and rotors between them. It is evident that the back plate, while acting as a thrust bearing, maintains the front rotor sides sufficiently close for the purpose of holding the fluid tight relation between the opening and closing chambers, or between the low and high pressure region.

It is therefore important in arranging the discharge valves with relation to the rotor chambers to avoid locking oil in the chambers where it will jam and lock the rotors from turning or at least subject the construction to damaging strains and heavy loss of power.

The arrangement of valves shown is of particular value as they make possible high compression. This is due to lack of "clearance", so-called, in the discharge passageways. If there is clearance, air under high pressure is carried past the discharge point and expands again in the gear spaces as they open, thus reducing or entirely preventing intake, and failing partly or entirely to discharge, according to the pressures employed, so that excessive clearance puts a low limit to the pressure possible as well as greatly reduces volumetric efficiency below such a limit of pressure. Of course this factor is of value chiefly with pumps capable of pumping air without serious loss thru leakage.

By taking in and discharging air through the cover plate, the other end of the pump is free for the driving connection with a shaft such as that of an electric motor.

My stuffing box is of particular value in connection with a rotary pump having a liquid seal, since it keeps the oil from draining out of the system and being lost, a result that would be fatal to the success of long continued automatic use where carrying large volumes of oil is not to be considered, such for example as in garage compressors, or air brake compressors, etc.

By providing the system with a radiator with a sufficient cooling area to keep the oil cool, the pump acquires an efficiency heretofore not attained. This is due to compression under conditions more nearly isothermal. These conditions are assisted by the spraying action of the oil when it enters the rotor chambers while being driven by pressure. As the liquid enters it bursts into mist which mixes intimately with the air and helps cool it and counteracts the heat of compression. As this oil is subsequently cooled it is ready to perform its cooling work over and over again. And the clearance in each annular chamber may carry an excess of liquid oil to cool the rotor surfaces at full mesh when the oil is spread over them by a pinion tooth entering each annular gear or rotor space. The oil separator 51, which may be of any useful type, cooperates with this pump by purging the air of oil and delivering free air. And as the temperature of high compression may be kept far below the vaporizing point of a good oil with my pump, the air is in a condition to be separated by the separator, which is usually capable only of removing liquid oil.

In practice I employ a radiator 55 as a reservoir, with a fan 56 on the other end of the motor from the compressor to cool the oil in the radiator, by driving or drawing air thru the radiator. The radiator may be mounted on posts 57 on the motor casing and may have perforations represented in broken lines to draw or drive the air thru for cooling purposes. I have used the term "oil" and "liquid seal" interchangeably since one may be the other. Other liquids however may be useful and are intended to lie within the scope of my invention. Other rotors than those described herein may be used with portions of my invention.

It is not to be understood that my compressor, or its novel features are limited to use with cycloidal rotors, since any rotors capable of performing one or more of the novel functions described herein may be substituted.

Many variations are possible as well as substitutions of features and the use of one or more portions of my invention or all of them together. I claim all such novel features and combinations of them as lying within the scope of my invention.

What I claim is:

1. In a rotary movement for operation by or upon fluids, a casing having inlet and outlet ports, and two rotor members capable of relative rotation, one within and eccentric to the other, one having a driving relation with the other, said rotors opening and closing chambers during rotation, and having contours providing fluid tight or pressure holding engagements between them between said ports, particularly at open mesh as said chambers pass from one port to the other, the teeth of one of said rotors having an arbitrarily selected oval convex contour of varying radius substantially non-circular, and the contours, convex and concave of the other rotor bearing a generative relation thereto, all of said contours being substantially non-circular, the tooth space or concave contours of the former rotor having a clearance beyond a generative relation to the convex contours of the latter rotor to prevent jamming after wear.

2. The combination claimed in claim 1 having as the arbitrarily selected contour a cycloid.

3. The combination claimed in claim 1 having as the selected contour an epicycloid on the inner rotor.

4. The combination claimed in claim 1 having the theoretically determined contours cut away at points not employed for pressure holding functions.

5. The combination claimed in claim 1 having the theoretically determined contours, when worn substantially free by service on one side, opening their other sides to form a continuous chamber along the intake port.

6. The combination claimed in claim 1, said rotors being provided with different numbers of teeth, each having convex cycloidal portions, and having concave contours whose sides comprise curves complementary to said convex contours as they cross the region of full mesh, and having outer portions of said contours not needed for pressure functions removed to provide openings between the rotors capable of carrying liquid across the center line at full mesh.

7. In a rotary mechanical movement for operation by or upon fluids, in combination two rotor members, one within and eccentric to the other, and both having oval tooth divisions forming rotor chambers which expand and contract during rotation, said tooth divisions having contours which have continuous fluid tight engagements between them during performance of pressure functions, intake and discharge ports for said chambers, said members capable of relative motion to cause said chambers to receive and discharge fluid through said ports, and valves one for each chamber, located in a rotor member close to the rotor chambers to eliminate clearance.

8. In a rotary mechanical movement for operation by or upon fluids, in combination, two rotor members, one within and eccentric to the other, one driven by the other by an efficient driving relation, and both having oval teeth forming rotor chambers between them which expand and contract during rotation, said teeth having contours which have mutually generative engagements between them during performance of the pressure functions, the tooth spaces being deeper and beyond reach of the teeth to hold oil and prevent jamming after wear, intake and discharge ports for said chambers, said rotors capable of relative motion to cause said chambers to receive and discharge fluid thru said ports, and having a driving shaft for one of said rotors maintaining said fluid tight engagements.

9. In a rotary mechanical movement for operation by or upon fluids, in combination, two rotor members, one within and eccentric to the other, and both having tooth divisions forming rotor chambers which expand and contract during rotation, said tooth divisions having contours which have continuous fluid tight engagements between them during performance of pressure functions, intake and discharge ports for said chambers, said members capable of relative motion to cause said chambers to receive and discharge fluid thru said ports, having annular tooth space curves undercut in outer nondriving and nonfluid tight engaging parts.

10. In a rotary mechanical movement for fluids, in combination, two rotor members, one within and eccentric to the other, both having tooth divisions forming rotor chambers which expand and contract during rotation, said tooth divisions having contours which have continuous fluid tight engagements between them during performance of pressure functions, said rotor members capable of relative rotary motion to cause said chambers to receive and discharge fluid, the teeth of one rotor having epicycloidal contours, and those of the other, hypocycloidal contours, a casing including high and low pressure conduits leading to said chambers, the tooth spaces of the inner rotor having hypocycloidal contours to roll upon the teeth of the outer rotor across the center line at full mesh.

11. In a rotary mechanical movement for fluids, in combination, two rotor members, one within and eccentric to the other, both having tooth divisions forming rotor chambers which expand and contract during rotation, said tooth divisions having contours which have continuous fluid tight engagements between them during performance of pressure functions, said rotor members capable of relative rotary motion to cause said chambers to receive and discharge fluid, the tooth crowns of one rotor having epicycloidal contours, and those of the other, hypocycloidal contours, a casing including high and low pressure conduits leading to said chambers, the tooth spaces of the inner rotor having hypocycloidal contours to roll upon the teeth of the outer rotor across the center line at full mesh, the tooth spaces of the outer or annular rotor having contours whose side or driving portions comprise curves determined by making them the complements of the tooth crown cycloids as they cross the center line at full mesh, a short discharge port suitable for air or gas compression, with said space curves of the outer rotor deepened in their outer portions to carry pools of oil for cooling tooth surfaces heated by the heat of compression.

MYRON F. HILL.